M. A. GREENE.
BEET TOPPER.
APPLICATION FILED SEPT. 17, 1918.
1,335,962.
Patented Apr. 6, 1920.
3 SHEETS—SHEET 1.
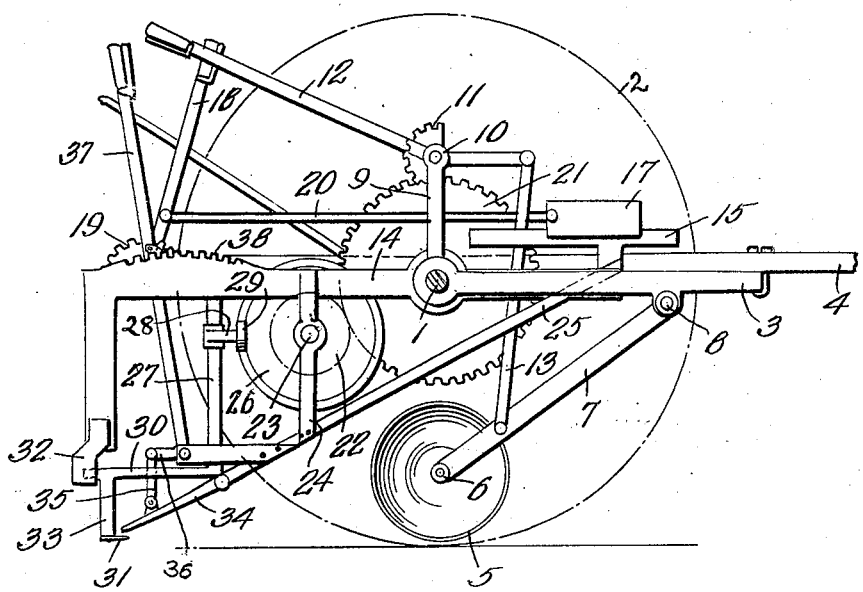
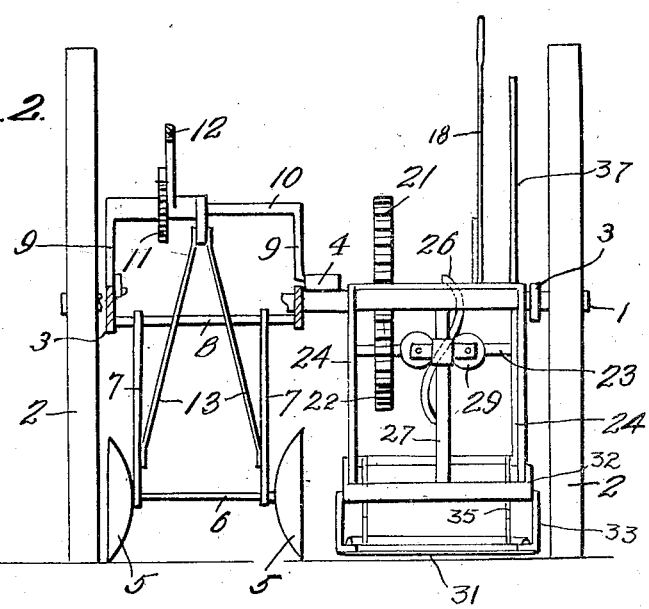
WITNESSES
Inventor
Morgan A. Greene

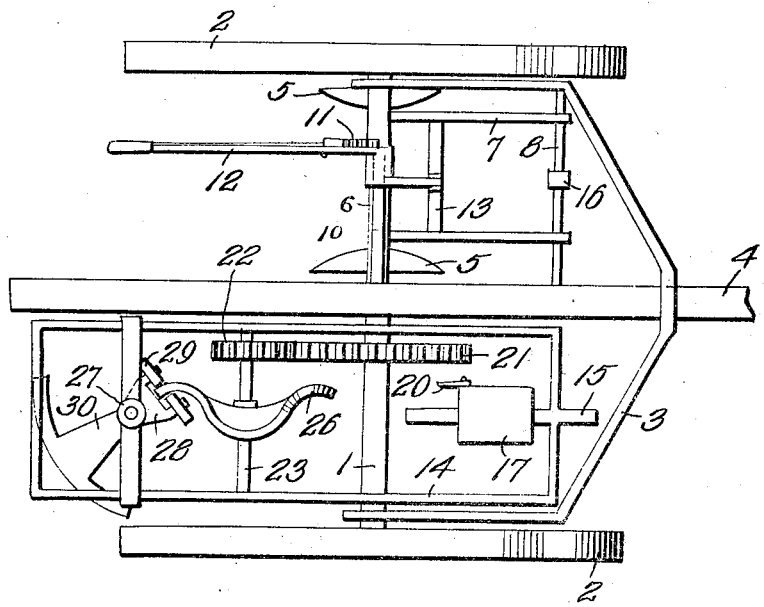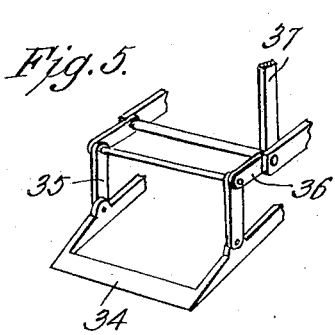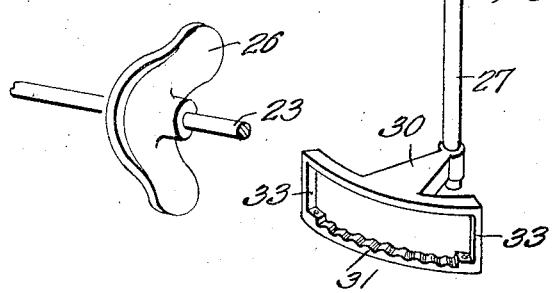

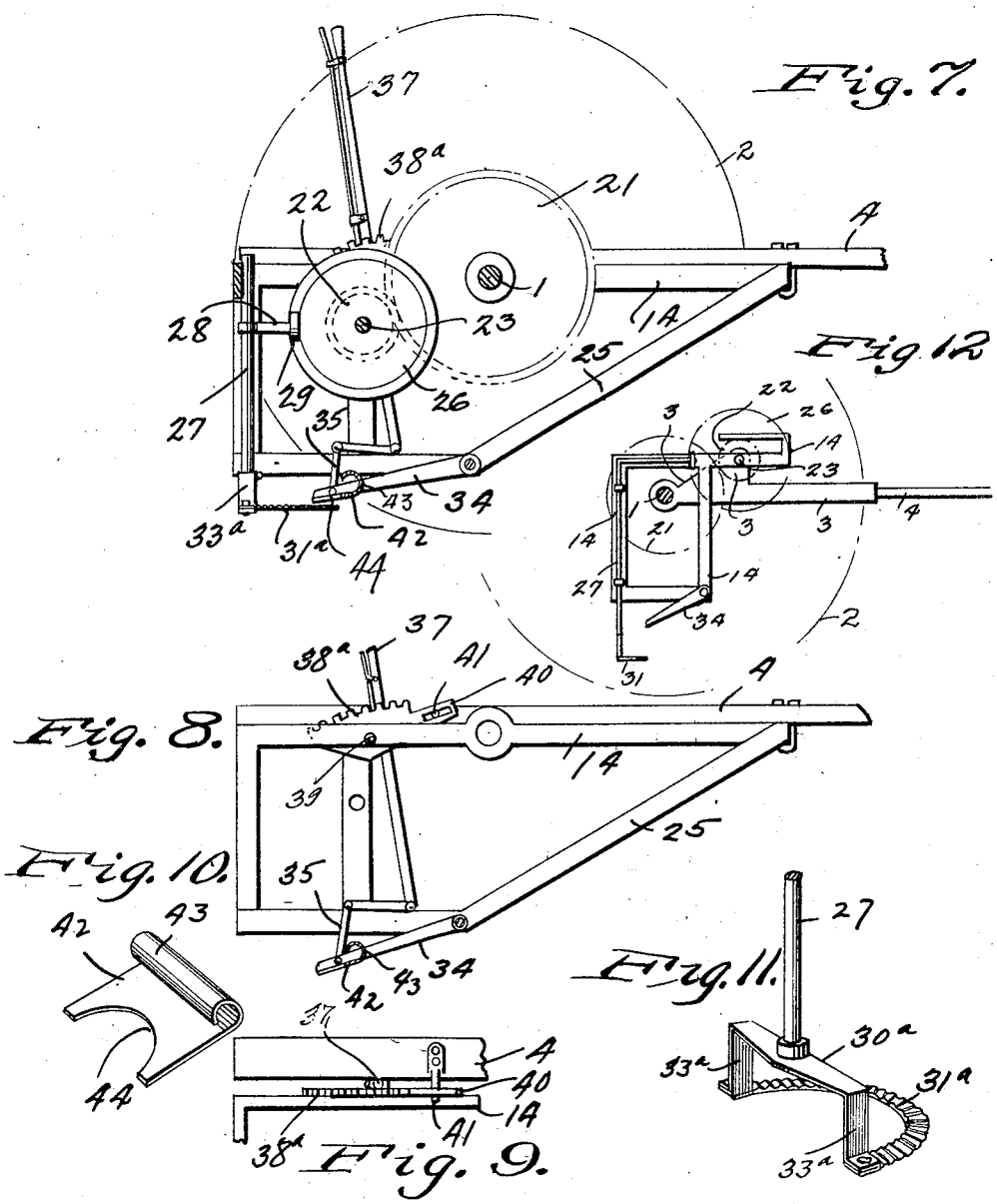

UNITED STATES PATENT OFFICE.

MORGAN A. GREENE, OF RUPERT, IDAHO.

BEET-TOPPER.

1,335,962.  Specification of Letters Patent.  Patented Apr. 6, 1920.

Application filed September 17, 1918. Serial No. 254,432.

*To all whom it may concern:*

Be it known that I, MORGAN A. GREENE, a citizen of the United States, residing at Rupert, in the county of Minidoka and State of Idaho, have invented certain new and useful Improvements in Beet-Toppers, of which the following is a specification.

This invention relates to agricultural machinery and more particularly to implements for removing the tops of roots such as beets.

The object of the invention is the provision of a beet topper which is effective in operation and adapted to be adjusted to meet varying conditions and which at all times is under control of the operator so that the machine may be adapted for light or heavy work.

The invention furthermore aims to provide a topping machine for beets and the like which may be operated with a minimum expenditure of power and which is comparatively light and susceptible of easy manipulation, the topping mechanism being adjustable and counterbalanced so as to be held to its work with any degree of pressure that may be found the most advantageous.

The drawing illustrates a preferred embodiment of the invention. However, it is to be understood that in adapting the same to meet different conditions, various changes in the form, proportion, and minor details of construction and arrangement and combination of parts, materials, dimensions, et cetera, may be resorted to as may prove expedient and fall within the scope of the appended claims.

In re drawings:—

Figure 1 is a view in elevation of a beet topping machine embodying the invention, the near wheel being removed and the far wheel being indicated in dotted lines, Fig. 2 is a rear view of the machine, parts being omitted, Fig. 3 is a top plan view portions being removed, Fig. 4 is a detail perspective view of the cam wheel for operating the cutting mechanism, Fig. 5 is a perspective view of the gage whereby the distance of the cutter is regulated from the surface of the ground, and Fig. 6 is a detail perspective view of the cutter.

Fig. 7 is a sectional detail of a modification.

Fig. 8 is a detail view of the modification having certain parts omitted.

Fig. 9 is a fragmentary view showing the parts associated with the pivotally mounted segment illustrated in connection with Figs. 7 and 8.

Fig. 10 is a detail perspective view of the plate forming a part of the gage shown in the modification.

Fig. 11 is a detail perspective view of the modified form of cutter.

Fig. 12 is a diagrammatic view of a modification.

Corresponding and like parts are referred to in the following description and indicated in the several views of the drawing by like reference characters.

The machine embodies an axle 1 which is provided at its opposite ends with supporting wheels 2 which are connected to the axle by the usual ratchet mechanism, not shown, to admit of the wheels 2 traveling at different rates of speed as when making a turn. The wheels 2 besides supporting the machine act as drivers for operating the topping mechanism. A frame 3 is pivotally mounted upon the axle 1 and comprises side bars and a front connecting bar of substantially V-form.

A pole or tongue 4 is connected with the frame 3 and is adapted to have the draft applied thereto in a manner well understood for drawing the implement over the field. The pole or tongue 4 is adapted to support the driver's seat in any desired way.

It is to be understood that the implement is adapted to operate on two rows of beets at the same time, hence the parts upon opposite sides of the pole or tongue 4 are of duplicate construction and arrangement although certain parts only are illustrated on each side to avoid confusion. The parts shown upon one side of the pole or tongue are omitted from the showing on the opposite side of the pole or tongue. Cutting disks 5 are mounted upon an axle 6 which in turn is supported by drag bars 7 which incline rearwardly and downwardly and are pivotally connected at their forward ends to a transverse rod 8. The disks 5 are designed to cut off leaves and also to form trenches at the sides of the row of beets. The disks 5 are adjustable vertically. Standards 9 project upwardly from the main frame and are connected at their upper ends by means of a cross bar 10 to which is secured a toothed segment 11. An operating lever 12 is mounted upon the cross bar 10 and is connected by means of links 13 with the drag bars 7. The lever 12 is provided with the usual hand latch which coöperates with the toothed segment 11 to hold the lever and the cutting disks 5 in the required adjusted position.

The topping mechanism embodies an oblong frame 14 preferably of rectangular outline. This frame is pivotally mounted upon the axle 1 and has a forward extension 15 which is adapted to engage a lug 16 on the cross bar 8 thereby limiting the tilting movement of the frame 14 in one direction. The extension 15 constitutes the forward portion of a longitudinally disposed bar upon which is slidably mounted a counter-balancing weight 17. This weight is of sufficient mass to effectively counter-balance the frame 14 and parts mounted thereon. The weight 17 may be moved and held in adjusted position by means of a lever 18 which is provided with the usual hand latch to coöperate with a toothed segment 19. A rod 20 connects the weight 17 with the lever 18.

A gear wheel 21 is secured to the axle 1 so as to rotate therewith and is in mesh with a pinion 22 secured on a transverse shaft 23. The shaft 23 is mounted in bearings of depending bars 24 which are strengthened at their lower ends by means of braces 25. A cam disk 26 is secured to the shaft 23 and constitutes operating means for the movable part of the topping mechanism. A vertically disposed shaft 27 is provided with a laterally extending member 28 to which is journaled a pair of rollers 29 which are arranged to operate upon opposite sides of the cam disk 26 whereby a rocking movement is imparted to the shaft 27. An arm 30 projects rearwardly from the lower end of the shaft 27 and is provided at its rear end with a cutter 31 which preferably has a toothed cutting edge, formed by corrugations on the top side of the cutter, the lower side of the cutter being plain. A guide 32 receives the rear end of the arm 30 so as to give proper support thereto. The cutting blade 31 is carried by depending extensions 33 near the rear end of the arm 30.

A gage 34 is disposed in advance of the cutting blade 31 and is adjustable vertically to regulate the distance of the cutting blade from the beets so that the tops may be cut at any determinate distance from the beets or like crop. Links 35 connect the gage 34 with arms 36 of operating lever 37. The lever 37 is provided with the usual hand latch which coöperates with toothed segment 38 to hold the gage 34 in the required adjusted position.

By proper adjustment of the counter balance 17 the cutting blade or topping mechanism may be counter balanced for light or heavy crop. As the machine is drawn over the field the cutter 31 is oscillated and removes the tops in a manner well understood.

In the modification shown in Figs. 7 and 8 and the detail views thereof the main parts are supported the same as illustrated in Figs. 1, 2 and 3, the difference residing in the cutter and the adjusting means for the gage coacting with the cutter. Referring to Figs. 7, 8 and 9 the numeral 38$^a$ designates the segment with which the operating lever 37 coöperates. This segment 38$^a$ is pivoted at 39 to the pivotally supported frame 14 and has an arm or extension 40 which is pivotally and slidably connected with the tongue 4 or some part of the main frame. The arm 40 is longitudinally slotted and receives a pin 41 or like part projecting laterally from the tongue 4. As the frame 14 pivots on the axle 1 the segment 38$^a$ is turned about its axis or pivotal support 39 by reason of the pivotal and sliding connecting of the arm 40 with the tongue or like part 4. It will thus be understood that the lever 37, held to the segment 38$^a$ by means of the usual latch, will move with the segment 38$^a$ and cause a corresponding pivotal movement of the gage 34, whereby the topping of the beets is automatically regulated.

The foregoing operation will be understood when it is remembered that when the gage 34 comes in contact with higher beets and raises the blade by tilting the topper frame 14, the arm 40 being held at 41 causes the pivoted segment 38$^a$ to move so as to increase the distance between the topping knife 31$^a$ and the gage 34. Again as the machine drops for a lower beet the segment 38$^a$ turns in an opposite direction and moves the lever 37 so as to lessen the distance. Thus, it will be understood the adjustment of the gage is automatic and will be caused by the pivotal movement of the frame 14 and is independent of the adjustment of the lever 37 by hand.

The topping mechanism shown in the modification comprises the vertical shaft 27 which is oscillated by means of the cam disk 26 in the manner hereinbefore stated. A yoke or frame is attached to the lower end of the shaft 27 and consists of the horizontal bar 30$^a$ and depending parts 33$^a$ at its ends to which the cutting blade 31$^a$ is attached. The blade 31$^a$ is disposed in advance of the shaft 27 and its forward edge is sharpened so as to cut the tops of the beets in advance of the blade and thereby prevent trash from interfering with the operation of the cutter. It is also noted that the cutting attachment of the blade is much nearer the axle and that the top knife is held more steady to the row of beets.

The gage 34 embodies a plate 42 which has its forward edge 43 curved upwardly so as to pass over the top of the beets with a minimum amount of resistance. The rear end of the blade 42 is cut away as indicated at 44 to conform to the forward convex cutting edge of the topping knife 31a.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

In the modification indicated in Fig. 12 the parts are differently formed and arranged. Like reference numerals designate corresponding parts. The frame 3 is pivotally mounted upon the axle 1 and the pole or tongue 4 is connected thereto in any desired way. The shaft 23 mounted on the frame 3 is disposed forwardly and upwardly from the axle 1 and has the cam wheel 26 secured thereto. The topper frame 14 is pivotally mounted upon the shaft 23 and is provided with the topping mechanism consisting of the vertical shaft 27, cutter 31 and guard 34.

It will be understood that the shaft 23 is journaled to the main frame which is mounted upon the axle, hence there is no tendency for the gearing 21 and 22 to separate since the same is held in fixed relation.

Having thus fully described my invention, what I claim as new and desire to secure by Letters Patent, is:—

1. In a topping machine, a vertically disposed shaft, an arm projecting horizontally from the shaft, a cutter carried by said arm, and means for imparting a rocking movement to the shaft, the same consisting of a cam wheel, and a roller extension from the shaft coöperating with the cam wheel.

2. In a topping machine the combination of a topping cutter, a gage coöperating therewith, a lever connected with the gage to admit of adjustment of the gage with reference to the cutter, a pivotal segment coöperating with the lever and means for automatically turning the segment to automatically adjust the gage according to the height of the tops of the beets.

3. In a topping machine the combination of a pivoted frame, a cutter movable with the pivoted frame, a gage movable with the pivoted frame and coacting with the cutter, a segment pivoted to the pivoted frame and having engagement with the fixed frame whereby to effect an automatic turning of the segment as the pivoted frame turns, and an operative lever for adjusting the gage and connected to the said pivoted segment to move therewith and automatically adjust the gage.

In testimony whereof I affix my signature in presence of two witnesses.

MORGAN A. GREENE.

Witnesses:
O. J. WAGGONER,
H. G. BLAIR.